United States Patent [19]
Nutter

[11] Patent Number: 5,454,989
[45] Date of Patent: Oct. 3, 1995

[54] VAPOR-LIQUID CONTACT APPARATUS

[76] Inventor: Dale E. Nutter, 7935 S. New Haven St., Tulsa, Okla. 74136

[21] Appl. No.: 216,297

[22] Filed: Mar. 23, 1994

[51] Int. Cl.⁶ ........................................................ B01F 3/04
[52] U.S. Cl. ...................................... 261/114.1; 261/114.5
[58] Field of Search ................................ 261/114.1, 114.5

[56] References Cited

U.S. PATENT DOCUMENTS

| | | | |
|---|---|---|---|
| 2,682,395 | 6/1954 | Claridge et al. | 261/114.1 |
| 3,233,708 | 2/1966 | Glitsch | 261/114.1 |
| 3,364,988 | 1/1968 | Hartmann | 261/114.1 |
| 4,120,919 | 10/1978 | McClain | 261/114.5 |
| 4,133,852 | 1/1979 | DiNicolantonio | 261/114.5 |
| 4,174,363 | 11/1979 | Bruckert | 261/114.1 |
| 4,499,035 | 2/1985 | Kirkpatrick et al. | 261/114.1 |
| 4,504,426 | 3/1985 | Chuang et al. | 261/114.1 |
| 4,550,000 | 10/1985 | Bentham | 261/114.1 |
| 4,956,127 | 9/1990 | Binkley et al. | 261/114.1 |
| 5,049,319 | 9/1991 | Nye | 261/114.1 |
| 5,192,466 | 3/1993 | Binkley | 261/114.1 |

FOREIGN PATENT DOCUMENTS

| | | | |
|---|---|---|---|
| 627942 | 3/1936 | Germany | 261/114.1 |
| 764103 | 9/1952 | Germany | 261/114.1 |

*Primary Examiner*—Tim R. Miles
*Attorney, Agent, or Firm*—Beveridge, DeGrandi, Weilacher & Young

[57] ABSTRACT

Vapor-liquid contact apparatus includes a plurality of substantially horizontal trays which are vertically spaced in a vessel. Liquid and vapor-liquid mixtures flow horizontally across the trays, over weirs, and vertically through downcomers to subsequent trays. Each tray has a bubble area with apertures which permit ascending vapors to flow into the vapor-liquid mixture supported on the tray. Each downcomer has an apertured bottom wall which is horizontally coextensive with an unapertured downcomer seal area on the tray therebelow. The downcomer seal area and a portion of the apertured bubble area are elevated with respect to a major portion of the tray's upper surface area. The tray has two outboard panels with integral flanges at their edges, and the upstream ends of these integral flanges are supported on a stationary truss in the vessel. To promote deentrainment of vapor from the mixture in the downcomer, a perforated sheet with inclined corrugations is positioned substantially vertically in the downcomer.

16 Claims, 2 Drawing Sheets

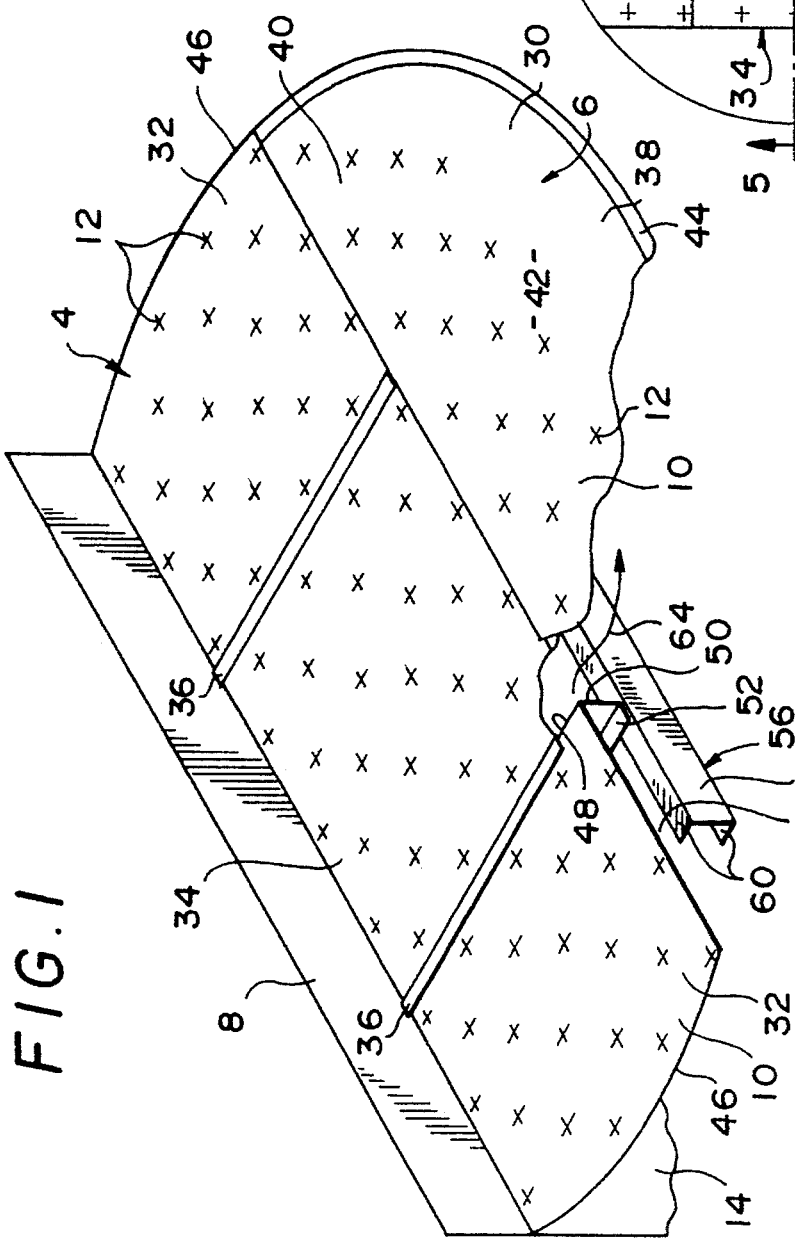

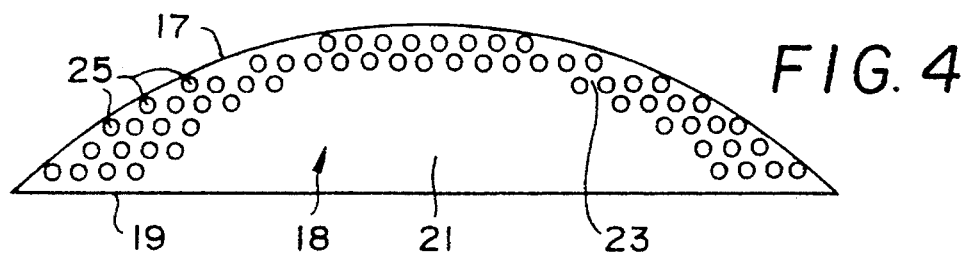
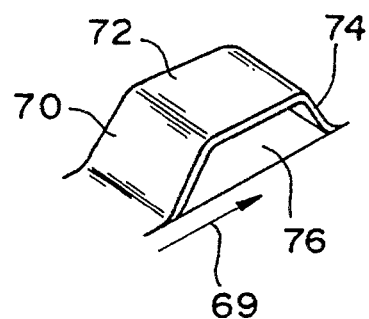
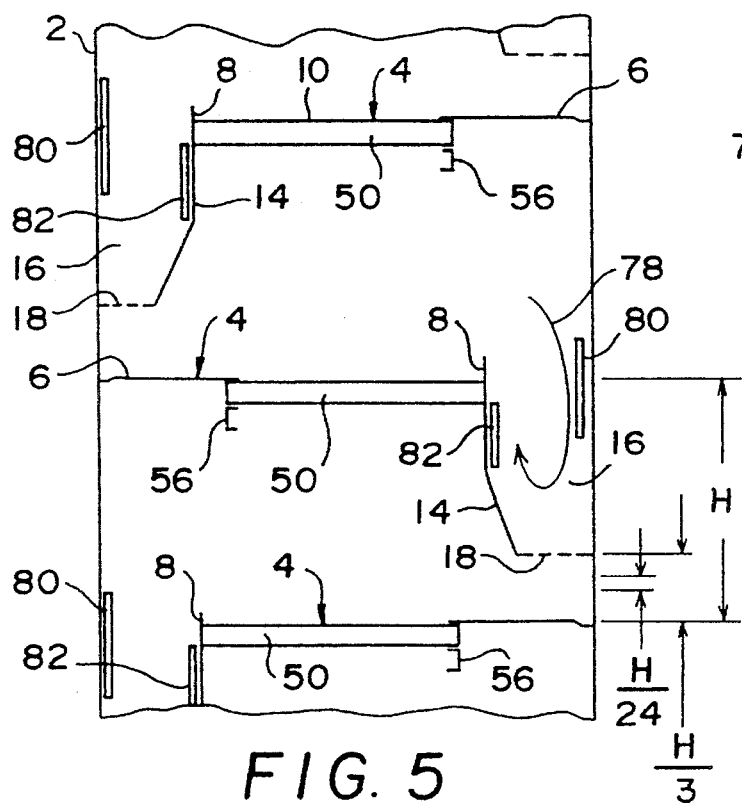
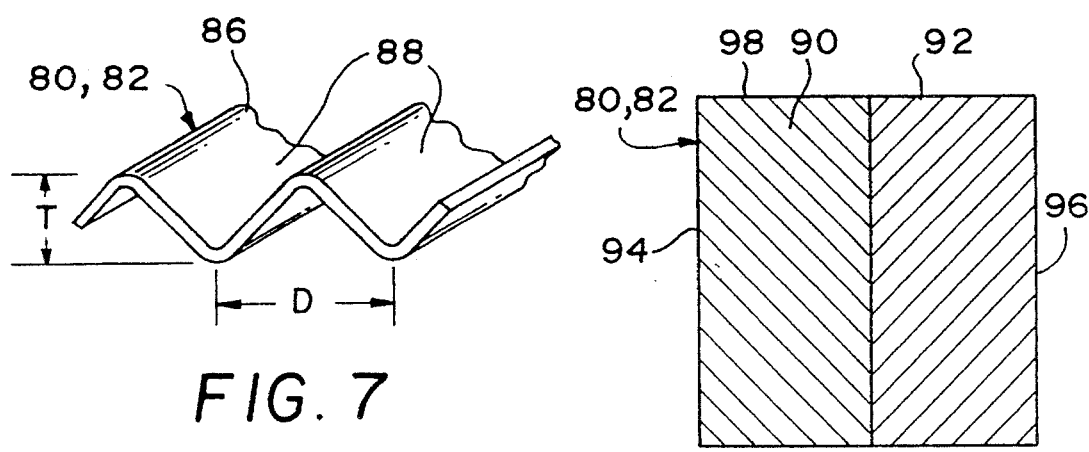

VAPOR-LIQUID CONTACT APPARATUS

BACKGROUND OF THE INVENTION

This invention relates to liquid contact apparatus used in chemical processing, and particularly to such apparatus in which a vessel contains a plurality of substantially horizontal trays which support a vapor-liquid mixture. In apparatus of this type, liquid is introduced at the upper end of the vessel and it flows down from tray-to-tray, via downcomers. The trays are apertured to provide bubble areas through which ascending vapors can rise to contact liquid and/or vapor-liquid mixtures which are supported on and flowing across the respective trays.

There have been many proposals for improving contact apparatus of this type. However, significant features of the apparatus disclosed in this specification are believed to represent new approaches to the design and construction of such apparatus.

Chuang et al. U.S. Pat. No. 4,504,426 shows gas-liquid contacting apparatus in which downcomers have apertured lower outlet walls. These downcomers, however, discharge directly over apertured areas of the deck therebelow. Such an arrangement can result in undesirable jetting of liquid down from the downcomer apertures through the apertures in the deck therebelow, thus bypassing two subsequent trays and reducing the performance of the apparatus.

A downcomer with an apertured outlet wall positioned over an elevated downcomer seal area is shown in Bentham U.S. Pat. No. 4,550,000. Bentham also has apertures in the elevated downcomer seal area, and this is believed to be detrimental from the standpoint of tray performance.

In U.S. Pat. No. 4,956,127 issued to Binkley et al., FIG. 8 shows a downcomer with an apertured outlet wall, but the downcomer seal area is provided with gas introducing openings located directly beneath a downcomer outlet. Binkley et al. also disclose a channel beam truss which directly supports an elevated upstream panel provided with the downcomer seal area. However, the channel truss is positioned where it inherently obstructs the horizontal flow of gas immediately beneath the truss-supported tray.

SUMMARY OF THE INVENTION

This invention relates to improvements in vapor-liquid contact apparatus of the type comprising a vessel, a plurality of substantially horizontal trays mounted in the vessel in vertically spaced relation to support a vapor-liquid mixture, and downcomer passages extending down from the trays. In a known manner, the downcomer passages are arranged to receive a vapor-liquid mixture from one tray and to release liquid onto a subsequent tray therebelow.

one aspect of the invention pertains to such apparatus in which each of said trays having a downcomer seal area, an overflow weir, and a bubble area which lies between the downcomer seal area and the overflow weir. The bubble area has apertures which permit ascending vapors to flow into the vapor-liquid mixture on the tray. The downcomer passage has a lower outlet end which overlies and is horizontally coextensive with a downcomer seal area of the subsequent tray. The novel combination of features in such an apparatus are as follows:

(a) each of the downcomer passages has a bottom wall which is substantially horizontal and is provided with apertures for regulating the effective head of fluid in the downcomer passage, (b) the downcomer seal area is substantially devoid of apertures so as to prevent ascending vapors from affecting the flow in a preceding downcomer passage of a tray thereabove and to prevent fluid in the preceding downcomer passage from weeping through the downcomer seal area; and (c) the downcomer seal area and an upstream portion of said bubble area are elevated with respect to a major portion of the tray's upper surface area.

Preferably, the trays are spaced vertically from each other by a distance H, and each of said downcomer passages has its lower outlet end between a minimum elevation which is at least H/24 higher than the weir of the subsequent tray and a maximum elevation which is a distance H/3 above the downcomer seal area of the subsequent tray. This elevation of the outlet prevents excessive horizontal velocity of fluid where it flows from the downcomer seal area to the bubble area of the tray. The downcomer seal area and the upstream portion of said bubble area are on an upstream panel, and the upstream portion of the bubble area is from 10% to 40% of the bubble area of the tray. The main portion of the upstream panel is elevated with respect to said arcuate margin portion on the upstream panel. Additionally or alternatively, the apparatus can include a shim which lies beneath the arcuate margin portion to elevate the upstream panel.

The bottom wall of the downcomer has an arcuate edge and a linear edge, and the area occupied by the apertures in the bottom wall of the downcomer is greater near the arcuate edge than near the linear edge.

In another respect, the invention involves a construction in which each tray is formed of a plurality of panels including two downstream panels which are laterally spaced apart and have downstream portions of the bubble area formed in them. These downstream panels each have a horizontal deck portion with an edge which has an integral flange extending downwardly therefrom. Each integral flange has a lower end provided with a horizontal web. The apparatus has a stationary truss which supports the upstream ends of said integral flanges. The stationary truss is spaced below the horizontal deck portions to provide an open area which permits vapors to flow between the truss and the deck portions.

Preferably, the truss has a web and flanges which extend from the web in a substantially horizontally direction which is upstream with respect to the tray therebelow so as to capture and laterally disperses part of the liquid froth or spray which is moving in a downstream direction on the tray therebelow. There is a third downstream panel which has a side margin which overlies and is supported by at least one of the downstream panels. The third downstream panel having a main portion which includes part of said bubble area, and the third downstream panel has its side margin elevated with respect to its main portion.

According to a further feature of the invention, a corrugated sheet is positioned vertically in a downcomer passage. The corrugated sheet has corrugations which form ridge and recesses, and the corrugated sheet has at least one surface which is exposed to and openly faces the vapor-liquid mixture in the downcomer passage to promote deentrainment of vapor from liquid in the mixture. The corrugations are inclined to position their ridges and recesses at an angle to the flow of liquid-vapor mixture in the downcomer passage so that the ridges reduce the local velocity of the mixture and the recesses provide channels for upward inclined flow of vapor which becomes deentrained from the mixture.

Preferably, the corrugations are inclined at an angle of about 45°. However, this angle may range from 20° to 70° from the horizontal. The corrugations are arranged in two sets of corrugations which extend upwardly and outwardly on the sheet. The corrugated sheets can be perforated to permit some pressure equalization across them.

BRIEF DESCRIPTION OF THE DRAWINGS

FIG. 1 is a perspective view of one tray constructed according to the invention.

FIG. 2 is a plan view of a tray according to the invention, mounted in a vessel.

FIG. 3 is a diagrammatic sectional view of a tray in the vessel, as seen along the line 3—3 in FIG. 2.

FIG. 4 is a view of the bottom wall of a downcomer in an apparatus constructed according to the invention.

FIG. 5 is a diagrammatic sectional view of three trays constructed according to the invention, mounted in a vessel.

FIG. 6 shows a preferred configuration of a tray opening.

FIG. 7 shows a portion of a corrugated sheet of the type which is mounted in a downcomer according to one feature of the invention.

FIG. 8 shows a full corrugated sheet which is suited for mounting in a downcomer.

DESCRIPTION OF A PREFERRED EMBODIMENT

As shown in FIGS. 2, 3, and 5, the complete apparatus includes a vessel 2 which contains a plurality of substantially horizontal trays 4 for supporting a vapor-liquid mixture. Liquid is introduced at the upper end of the vessel and it flows down from tray-to-tray where it is contacted by ascending vapors which are introduced at the lower end of the vessel.

The trays are vertically spaced from each other. Each tray has a downcomer seal area 6, an overflow weir 8, and a bubble area 10 which lies between the downcomer seal area 6 and the overflow weir 8. The downcomer seal area is elevated with respect to a major portion of the tray's upper surface area.

The bubble area 10 has apertures represented schematically by plus signs ("+") 12 which permit ascending vapors to flow into the vapor-liquid mixture on the tray. A downcomer wall 14 is attached to and extends down from each weir to provide a downcomer passage 16 which carries liquid from the downstream end of one tray to the downcomer seal area 6 of the next lower tray. The lower outlet end of the downcomer passage 16 overlies and is substantially coextensive with the downcomer seal area 6 of the next lower tray.

The downcomer seal area 6 is substantially devoid of any apertures. This prevents ascending vapors from affecting the fluid flow in the downcomer passage 16 above the downcomer seal area, and it also prevents fluid in the downcomer passage from weeping through the downcomer seal area 6. The latter characteristic is particularly important because any weepage through the downcomer seal area significantly affects performance because it permits the fluid to bypass two trays.

At the lower end of each downcomer passage 16, there is a bottom wall 18 which is substantially horizontal and is provided with apertures 25 for regulating the effective head of fluid in the downcomer passage 16. These apertures may have any suitable size and shape. For example, they may be square or round holes which each have an area no greater than about one square inch. Their total area can be from 10 to 50% of the horizontal area at the top of the downcomer 16. By changing the total area of the openings in the bottom 18 of the downcomer, it is possible to adjust the head in the downcomer to ensure total vapor disengagement from the liquid flowing to the next lower tray, thus affecting the overall performance of the apparatus.

As shown in FIG. 4, the area occupied by the openings in the bottom wall 18 of the downcomer 16 is greater near its arcuate edge 17 than near its linear edge 19. The bottom wall 18 has an unapertured segmental area 21 which is bounded in part by the edge 19. Near the edge 17, it has an arcuate apertured area 23 which is perforated with circular holes 25.

The trays are spaced vertically from each other by a distance M. Each of the downcomer passages 16 has its bottom or outlet end 18 between a minimum elevation $E_{mm}$ which is at least M/24 higher than the weir of the subsequent tray and a maximum elevation $E_{max}$ which is a distance H/3 above the downcomer seal area of the subsequent tray. This is a higher downcomer outlet elevation than is customary in the industry, and it is beneficial because it results in a slower flow of liquid from the downcomer seal area 6 to the bubble area 10 of the tray. By avoiding excessive horizontal fluid velocities in this area, the aeration of the liquid is promoted in the upstream portions of the bubble area.

Details of a typical tray 4 are shown in FIG. 1. It has an upstream panel 30, two outboard panels 32, and a central panel 34 which is removable to provide a manway during installation and maintenance of the apparatus. The vessel 2 has an internal support ring which supports the circumferential margins of the tray 4. The upstream panel 30 includes an unapertured upstream area 38 which constitutes the downcomer seal area, and an apertured area 40 which is the upstream portion of the tray's bubble area 10. The bubble area in panel 30 is from 10% to 40% of the bubble area of the tray. Preferably, it is about 25% of the tray's total bubble area. The upstream panel 30 of the tray 4 has a flat main horizontal deck portion 42 and an arcuate margin portion 44. The main horizontal deck portion 42 is flat, and it is about one tray thickness higher than the margin portion 44. The downstream margin portion of the panel 30 overlies the upstream margins of the downstream panels 32 and 34. Because the upstream panel 30 is supported on the downstream panels 32,34 and on the arcuate margin portion 44 which rests on the support ring in the vessel, the main portion 42 of the upstream panel 30 is higher by about one plate thickness than the downstream panels 32,34. Arcuate shims can be placed under the arcuate margin 44 in order to elevate the main portion 42 of the upstream panel 30. Chordal shims may be placed under the downstream margin portion of panel 30.

Each of the outboard panels 32 has an arcuate outboard edge 46 and a linear inboard edge 48 provided with an integral flange 50 which extends downwardly. A horizontal web 52 extends laterally in an outboard direction from the lower end of each of the flanges 50. The flanges 50 stiffen their respective panels, and they also support the upstream ends of the panels 32 on a transversely oriented truss 56 which may be of any mechanically suitable cross-section. Preferably, the truss 56 has a channel shape with a vertical web 58 and two flanges 60 which extend horizontally from the web in a downstream direction which is upstream with respect to fluid flow on the tray therebelow. Due to this orientation, the truss 56 captures and laterally disperses part of the liquid froth or spray which is moving in a downstream direction on the tray therebelow. Above the truss 56, between the flanges 50, there are open areas 62 through which vapor can flow as it travels toward the bubble portion 40 of the upstream panel of the tray thereabove. The path of this flow is represented by the arrow 64 in FIG. 1. The ends of the truss are clamped rigidly to the support ring in the vessel. Except for their flange portions, the outboard panels 32 are substantially flat, and their upstream margin portions are overlapped by the downstream margin portion of the upstream panel 30.

The central or manway panel 34 has side margin portions 36 which overlie the inboard margin portions of the panels 32. The main surface area of the central panel is one plate thickness lower than the margin portions 36 so it lies in substantially the same horizontal plane as the outboard panels 32. An upstream margin portion of the central panel 34 lies beneath and is bolted to the downstream margin portion of the upstream panel 30.

The weir/downcomer assembly is fastened to and supports the downstream ends of the panels 32,34 and to the vessel 2 to provide a fluid tight seal.

Since the upstream panel 30 is slightly higher than the central and outboard panels 32,34, the liquid head on the upstream panel is less. This reduces the head potential so the initial vapor bubbling will occur here. This also deters weepage down through the apertures in the upstream panel in this area where the liquid has not yet become significantly aerated.

It is believed that the invention is suited for sieve trays, valve trays, bubble cap trays, and trays with trapezoidal apertures such as those shown in U.S. Pat. No. 3,463,464 of Aug. 26, 1969.

A recent improvement to trays of the latter type is shown in FIG. 6. It has a longitudinal axis which is parallel to the flow direction indicated by arrow 69, and it is tapered in the plane of the deck from a maximum dimension transverse to the flow direction at its upstream end to a minimum dimension transverse to the flow direction at its downstream end. A deflector overlies the aperture, and it includes an upstream portion 70, a central portion 72, and a downstream portion 74. Each deflector is integral with the deck and is, in vertical projection, substantially geometrically identical to its respective aperture. The upstream portion 70 of the deflector extends at an obtuse angle above the deck at an upstream end of the associated aperture, and it lies across the entire maximum transverse extent of the aperture so that the entirety of the aperture is shielded from liquid which is moving in the flow direction toward the aperture. The downstream portion 74 of the deflector extends at an obtuse angle above the deck at the downstream end of its aperture, and it lies across the entire transverse extent of the downstream end of the aperture to prevent vapors from impelling liquid in a downstream direction. The central portion 72 of the deflector is supported on the deck by the upstream and downstream deflector portions 70, 74. The deflector and the adjacent deck define lateral outlet slots 76 which are oriented to direct vapor which passes up through the aperture in directions which are generally transverse to the flow direction of liquid on the deck. Each outlet slot has an area of about 0.25 to 0.35 square inches. Each of the outlet slots 76 has an upper edge no longer than about 0.85 inch, a height which is no greater than 0.35 inch, and a lower edge which is no longer than about 2.0 inches. Each aperture, in the plane of the tray deck, has a length no greater than 2.0 inches measured along its longitudinal axis, an upstream width no greater than about 1.0 inch, and a downstream width no greater than 0.75 inch. Preferably, the centers of the apertures are spaced apart no more than about 3.0 inches longitudinally of the flow direction, and no more than about 2.0 inches transversely of the flow direction. The apertures are arranged in longitudinal rows, and the apertures in adjacent longitudinal rows are staggered so that an aperture in one row has a longitudinal position which is midway between the longitudinal positions of two apertures in an adjacent row.

The two phase mixture of vapor and liquid is in a turbulent state when it enters the upper end of a downcomer 16. There is some circular motion as indicated by the arrow 78 in FIG. 5. During the residence time of the mixture in the downcomer 16, the vapor is deentrained from the liquid. The deentrained vapors rise, and the liquid is discharged from the outlet at the bottom end of the downcomer.

Deentrainment in the downcomer is promoted by mounting corrugated sheets 80 and/or 82 in the downcomer substantially vertically, i.e. within 15° of a vertical plane. As shown in FIG. 7, each of these sheets has corrugations which form ridges 86 and recesses 88. Each sheet has at least one exposed surface which openly faces the vapor-liquid mixture in the downcomer passage 16. The term "openly faces" means that there is no adjacent sheet or wall which contacts the ridges 86 to affect the flow of the two phase mixture in the region of the exposed surface of the corrugated sheet.

The sheets 80 and 82 each have one exposed surface. Additionally or alternatively, a corrugated sheet may be suspended vertically between and spaced from the sheets 80 and 82, and it would have two exposed surfaces.

The corrugations in the sheets are oriented so that their ridges 86 and recesses 88 are inclined. The sheet 80 shown in FIG. 8 is laterally symmetrical. It has two mirror image sets of corrugations 90 and 92 which each occupy one half of the sheet. The corrugations extend upwardly toward opposite outboard or lateral edges 94 and 96 of the sheet, so that the deentrained vapors will be released from the channel outlets at the upper edge 98 and outboard edges 94 and 96 of the sheet.

The sheets 80 and 82 can be formed of stainless steel having a thickness of 0.008 inch, or carbon steel having a thickness of 0.12 inch, or any other suitable material. The corrugations are inclined to the horizontal at an angle of about 45°, although inclinations of 20° to 70° may be suitable. The corrugations can have a ridge-to-ridge distance D of about one inch, and the total thickness ! of the corrugated sheets can be about one-half inch.

The corrugated sheets 80 and 82 may be fabricated from perforated stock to permit limited pressure equalization across them. This is thought to enhance the deentrainment effect. Preferably, the perforations are holes which have diameters of about 1/8 to 1/4 inch, and the hole centers are spaced apart by distances of about twice their diameters, set at a triangular pitch. Holes of 3/16 inch diameter at 3/8 inch spacing are well suited for this purpose.

The ridges 86 are not vertical, so they reduce the velocity of the two phase mixture. The recesses 88 are not horizontal, so they provide the channels 100 which agglomerate and shield the vapor bubbles from local velocities so that they can rise up in the downcomer. The vapor deentrainment phenomenon within the boundaries near the exposed surfaces of the sheets is not entirely understood, but the compressibility of vapor and the incompressibility of liquid may explain why the vapor rather than the liquid agglomerates and flows in the channels of the corrugated sheet.

Although only one embodiment of the invention has been shown, persons skilled in the art will realize that the invention may take many other forms. For example, the invention is applicable to multi-pass trays as well as the one-pass design disclosed herein; and, the integral flanges 50 can be provided on inboard as well as outboard panels of the tray. Accordingly, it is emphasized that the invention is not limited to the disclosed embodiment, and that it embraces modifications, variations, and improvements thereto which fall within the spirit of the following claims.

I claim:

1. Vapor-liquid contact apparatus, comprising, a vessel, a plurality of substantially horizontal trays for supporting a vapor-liquid mixture, said trays being mounted in said vessel and vertically spaced from each other;

each of said trays having a downcomer seal area, an overflow weir, and a bubble area which lies between the downcomer seal area and said overflow weir, said bubble area having apertures which permit ascending vapors to flow into the vapor-liquid mixture on the tray, a downcomer passage extending down from each weir to carry liquid from a tray to the downcomer seal area of a subsequent tray therebelow, said downcomer passage having a lower outlet end which overlies and is horizontally coextensive with said downcomer seal area of the subsequent tray, each said tray being formed of a plurality of panels including two downstream panels which are laterally spaced apart and have downstream portions of said bubble area formed therein, said two downstream panels each having a horizontal deck portion with an edge which has an integral flange extending downwardly therefrom, each said integral flange having a lower end provided with a horizontal web, said apparatus having a stationary truss which extends transversely and supports upstream ends of said integral flanges, said stationary truss being spaced below said horizontal deck portions to provide an open area which permits vapor to flow between the truss and the deck portion.

2. Apparatus according to claim 1 wherein said truss has a web and flanges which extend from the web in a substantially horizontally direction which is upstream with respect to the tray therebelow so as to capture and laterally disperse part of the liquid froth or spray which is moving in a downstream direction on the tray therebelow.

3. Apparatus according to claim 1 wherein there is a third downstream panel which has a side margin which overlies and is supported by at least one of said downstream panels, said third downstream panel having a main portion which includes part of said bubble area, said third downstream panel having its side margin elevated with respect to its main portion.

4. Apparatus according to claim 1 wherein said downcomer seal area is substantially devoid of apertures so as to prevent ascending vapors from affecting flow in a preceding downcomer passage of a tray thereabove, and to prevent fluid from the preceding downcomer passage from weeping through the downcomer seal area.

5. Apparatus according to claim 1 wherein said downcomer seal area and an upstream portion of said bubble area are elevated with respect to said downstream panels.

6. Apparatus according to claim 5 wherein said upstream portion of the bubble area is from 10% to 40% of the bubble area of the tray.

7. Apparatus according to claim 1 wherein said downcomer seal area and said upstream portion of said bubble area are on an upstream panel, said upstream panel having a downstream margin portion which overlies and is supported by margin portions of said downstream panels.

8. Apparatus according to claim 1 wherein said downcomer seal area and said upstream portion of said bubble area are on an upstream panel which has a main portion and an arcuate margin portion, said main portion being elevated with respect to said arcuate margin portion.

9. Apparatus according to claim 1 wherein said downcomer seal area and said upstream portion of said bubble area are on an upstream panel which has a main portion and an arcuate margin portion, said apparatus including a shim which lies beneath said arcuate margin portion to elevate said upstream panel.

10. Vapor-liquid contact apparatus, comprising, a vessel, a plurality of substantially horizontal trays for supporting a vapor-liquid mixture, said trays being mounted in said vessel in vertically spaced relation, a downcomer passage extending down from each tray, said downcomer passages each being arranged to receive a vapor-liquid mixture from one tray and to release liquid onto a subsequent tray therebelow, a corrugated sheet positioned substantially vertically in said downcomer passage, said corrugated sheet having corrugations which form ridges and recesses, said corrugated sheet having at least one surface which is exposed to and openly faces the vapor-liquid mixture in the downcomer passage to promote deentrainment of vapor from liquid in the mixture, said corrugations being inclined to position their ridges and recesses at an angle to the flow of liquid-vapor mixture in the downcomer passage so that said ridges reduce the local velocity of the mixture and said recesses provide channels for upward inclined flow of vapor which becomes deentrained from the mixture.

11. Apparatus according to claim 10 wherein said corrugations are inclined at an angle of about 45°.

12. Apparatus according to claim 10 wherein said corrugations are inclined at an angle of 20° to 70° from the horizontal.

13. Apparatus according to claim 10 wherein said corrugations include in two sets of corrugations which extend upwardly and outwardly on the sheet.

14. Apparatus according to claim 10 wherein said corrugated sheets are perforated to permit some pressure equalization across them.

15. Vapor-liquid contact apparatus, comprising, a vessel, a plurality of substantially horizontal trays for supporting a vapor-liquid mixture, said trays being mounted in said vessel in vertically spaced relation, each of said trays having a downcomer seal area, an overflow weir, and a bubble area which lies between the downcomer seal area and said overflow weir, said bubble area having apertures which permit ascending vapors to flow into the vapor-liquid mixture on the tray, a downcomer passage extending down from each weir for carrying liquid from a tray to the downcomer seal area of a subsequent tray therebelow, said downcomer passage having a lower outlet end which overlies and is horizontally coextensive with said downcomer seal area of the subsequent tray, each of said downcomer passages having a bottom wall which is substantially horizontal and is provided with apertures for regulating the effective head of fluid in the downcomer passage, said bottom wall of the downcomer having an arcuate edge and a linear edge, said apertures in the bottom wall of the downcomer occupying a greater area near the arcuate edge than near the linear edge, said downcomer seal area being substantially devoid of apertures in its area which is vertically aligned with said apertures in said bottom wall of the downcomer so as to prevent ascending vapors from affecting the flow in a preceding downcomer passage of a tray thereabove and to prevent fluid in the preceding downcomer passage from weeping through the downcomer seal area, said downcomer seal area and an upstream portion of said bubble area being elevated with respect to a major portion of the tray's upper surface area.

16. Vapor-liquid contact apparatus, comprising, a vessel, a plurality of substantially horizontal trays for supporting a vapor-liquid mixture, said trays being mounted in said vessel in vertically spaced relation, each of said trays having a downcomer seal area, an overflow weir, and a bubble area which lies between the downcomer seal area and said overflow weir, said bubble area having apertures which permit ascending vapors to flow into the vapor-liquid mixture on the tray, a downcomer passage extending down from each weir for carrying liquid from a tray to the downcomer seal area of a subsequent tray therebelow, said downcomer passage having a lower outlet end which overlies and is horizontally coextensive with said downcomer seal area of the subsequent tray, each of said downcomer passages having a bottom wall which is substantially horizontal and is provided with apertures for regulating the effective head of fluid in the downcomer passage, said downcomer seal area being substantially devoid of apertures in its area which is vertically aligned with said apertures in said bottom wall of the downcomer so as to prevent ascending vapors from affecting the flow in a preceding downcomer passage of a tray thereabove and to prevent fluid in the preceding downcomer passage from weeping through the downcomer seal area, said downcomer seal area and an upstream portion of said bubble area being elevated with respect to a major portion of the tray's upper surface area, said downcomer passages each being arranged to receive a vapor-liquid mixture from one tray and to release liquid onto a subsequent tray therebelow, a corrugated sheet positioned substantially vertically in said downcomer passage, said corrugated sheet having corrugations which form ridges and recesses, said corrugated sheet having at least one surface which is exposed to and openly faces the vapor-liquid mixture in the downcomer passage to promote deentrainment of vapor from liquid in the mixture, said corrugations being inclined to position their ridges and recesses at an angle to the flow of liquid-vapor mixture in the downcomer passage so that said ridges reduce the local velocity of the mixture and said recesses provide channels for upward inclined flow of vapor which becomes deentrained from the mixture.

* * * * *